United States Patent
Hernan Blanco

(10) Patent No.: US 10,807,051 B2
(45) Date of Patent: Oct. 20, 2020

(54) CARBONATION DUCT FOR BLENDING A GAS AND A BEVERAGE AND CARBONATION PROCESS

(71) Applicant: CYLZER S.A., Montevideo (UY)

(72) Inventor: Javier Hernan Blanco, Buenos Aires (AR)

(73) Assignee: CYLZER S.A. (UY)

( * ) Notice: Subject to any disclaimer, the term of this patent is extended or adjusted under 35 U.S.C. 154(b) by 205 days.

(21) Appl. No.: 15/762,963

(22) PCT Filed: Sep. 2, 2016

(86) PCT No.: PCT/BR2016/050217
§ 371 (c)(1),
(2) Date: Mar. 23, 2018

(87) PCT Pub. No.: WO2017/049374
PCT Pub. Date: Mar. 30, 2017

(65) Prior Publication Data
US 2019/0083946 A1 Mar. 21, 2019

(30) Foreign Application Priority Data
Sep. 25, 2015 (BR) .............................. 102015024683

(51) Int. Cl.
*B01F 3/04* (2006.01)
*A23L 2/54* (2006.01)
(Continued)

(52) U.S. Cl.
CPC .............. *B01F 5/0415* (2013.01); *A23L 2/54* (2013.01); *B01F 3/04787* (2013.01);
(Continued)

(58) Field of Classification Search
CPC .......... A23L 2/54; B01F 3/04; B01F 3/04751; B01F 3/04808; B01F 3/04815; B01F 5/0415
(Continued)

(56) References Cited

U.S. PATENT DOCUMENTS

| | | | |
|---|---|---|---|
| 9,622,504 B2 * | 4/2017 | Lavaque | ............... B01F 5/0428 |
| 2011/0230679 A1 | 9/2011 | Gillis et al. | |
| 2013/0037973 A1 | 2/2013 | Lavaque | |

FOREIGN PATENT DOCUMENTS

GB     1 329 121     9/1973

OTHER PUBLICATIONS

International Search Report dated Dec. 22, 2016 for International application No. PCT/BR2016/050217.
(Continued)

*Primary Examiner* — Robert A Hopkins
(74) *Attorney, Agent, or Firm* — Fay Sharpe LLP

(57) ABSTRACT

Carbonation duct (1) for blending a gas and a beverage. The carbonation duct (1) includes a tubular structure (12) surrounding a compression structure (13), the compression structure (13) longitudinally positioned inside the tubular structure (12) and setting a pathway (14) for the flowing of the beverage along the carbonation duct (1). The compression structure (13) includes external diameters (P,C,G) sequentially defining a convergence path (8), a mixture path (19) and a slowdown path (20) along the carbonation duct (1), wherein, in the convergence path (8), the carbonation duct (1) includes a gas entry portion (9) for gas injection in the pathway (14), and the tubular structure (12) defines a turbilionating projection (10) establishing a carbonation duct (1) mixture diameter (F).

30 Claims, 8 Drawing Sheets

(51) Int. Cl.
    *B01F 5/04*         (2006.01)
    *B01F 5/06*         (2006.01)
    *B01F 15/00*       (2006.01)

(52) U.S. Cl.
    CPC ...... *B01F 3/04808* (2013.01); *B01F 3/04815* (2013.01); *B01F 5/0428* (2013.01); *B01F 5/0653* (2013.01); *B01F 15/00162* (2013.01); *A23V 2002/00* (2013.01); *B01F 2003/049* (2013.01); *B01F 2005/0448* (2013.01); *B01F 2005/0634* (2013.01); *B01F 2215/0022* (2013.01)

(58) Field of Classification Search
    USPC .......................................................... 261/76
    See application file for complete search history.

(56) References Cited

OTHER PUBLICATIONS

Written Opinion dated Dec. 22, 2016 for International application No. PCT/BR2016/050217.

* cited by examiner

CARBONATION DUCT FOR BLENDING A GAS AND A BEVERAGE AND CARBONATION PROCESS

Present invention refers to a carbonation duct and a carbonation process. Specifically, present invention is related to a carbonation duct and process which increases the gas solubility in a beverage.

In the carbonation processes and ducts known in the art is inevitable to keep the pressure in the carbonator tank stable in order to maintain the $CO_2$ volume constant in the beverage.

This happens due to the fact that in the processes and ducts known in the art, the variables (i) beverage temperature, (ii) beverage flow rate, (iii) $CO_2$ flow rate in the carbonation duct gas entry portion and (iv) carbonation duct structural configuration are all related to each other in order to achieve an uniform value for the $CO_2$ volume in the beverage.

In the carbonation process proposed in the present invention, while the beverage enters the carbonator tank and the pressure inside the tank starts to increase (considering that the valve in the tank output is closed), such increment of pressure is controlled by managing (controlledly closing) the $CO_2$ flow rate in the carbonation duct by controlling a modulating valve percentage of opening.

On the other hand, in the proposed process if the pressure in the tank decreases, such drop of pressure will be controlled by increasing the $CO_2$ flow rate in the carbonator tank.

In other words, if the pressure in the tank increases, the modulating valve is closed ($CO_2$ flow rate in the venturi is reduced). In the conventional process known in the state of the art, when the pressure in the tank increases, the $CO_2$ is expelled (vented) to the atmosphere.

In the present process, no $CO_2$ is expelled, all pressure variations in the tank are instantly compensated by managing the $CO_2$ flow rate in the carbonation duct and in the carbonator tank.

Additionally, the carbonation duct proposed herewith makes use of a turbilionating projection in the area adjacent to the gas entry portion, providing an efficient turbulence between the beverage and the $CO_2$.

The ducts known in the art make use of high pressure pumps to create a high pressure area for the $CO_2$ and beverage mixture (blending). Further, these ducts provide a carbonation process which demands several steps to achieve a desired $CO_2$ volume which results in a very stir beverage (agitated), turning the beverage filling process non efficient.

Further, the carbonation ducts known in the art reduce the area of the duct like a bottle neck. In present invention, the area of the duct is reduced by adding a stainless solid body in the duct which increases the contact area between the beverage and the gas.

If the beverage flow rate is kept constant and the area of the carbonation duct is reduced, the beverage velocity increases as it passes through the reduced area. Consequently, if the kinetic energy increases, the energy determined by the pressure value reduces considerably.

This drop of pressure generates vacuum in the reduced area of the carbonation duct proposed in the present invention. This principle is used in the proposed carbonation duct to introduce $CO_2$ in the duct.

Even though this drop of pressure favors the mixture between the gas and the beverage, to improve such mixture and ensure a high efficiency in the process, the carbonation duct proposed herewith further uses a turbilionating projection in the reduced area of the duct.

One of the main advantages of the proposed carbonation duct lies on the fact that the pressure difference between the carbonation duct entry and exit is in the range of 10% and 20%. This means that, a pressure in the duct entry of 2,0 $kg/cm^2$ will decrease to just 1,6 $kg/cm^2$ (maximum decrement) to 1,8 $kg/cm^2$ (minimum decrement) in the duct exit portion. In the conventional ducts known in the state of art, this pressure difference can reach 50%.

Further, the efficiency of the proposed carbonation duct does not require the use of a homogenizing processes after the carbonation, as required in some carbonation processes and systems known in the state of the art.

Another advantage of the carbonation duct is that it allows an optimal $CO_2$ dissolution in the water, minimizing the $CO_2$ consumption.

Additionally, the carbonation duct as proposed generates a very low impact over the gas kinetic energy soluble in the beverage. Consequently, the beverage foaming at the time of filling is minimized.

Another advantage of the carbonation duct proposed in the present invention is that the use of a flow meter is not required in order to control the gas flow rate in the carbonation process, even so the carbonation process efficiency is achieved.

Further, the proposed carbonation process makes use of a carbonator tank that does not comprise any rings, plates, or any other equipment inside of it. The claimed process only uses a carbonator tank to reach the gas solubilization.

Additionally, in the claimed process there is no venting of gas, since the gas that is not dissolved in the beverage is recovered to be used again in the process.

The carbonation duct further uses the beverage velocity as it enters the duct to generate the necessary vacuum to provide the beverage carbonating, so, the gas pressure in the gas entry portion is relatively low.

The claimed process further provides the possibility of recirculating the beverage to increase or reduce the gas volume.

Additionally, with the process proposed herewith, if the beverage temperature increases, the compensated pressure (the required pressure to establish a desired volume of gas in the beverage) is increased, and, in order to keep constant the volume of $CO_2$ solubilized in the beverage, $CO_2$ will be added in the tank (increasing the tank's pressure).

Alternatively, if the beverage temperature decreases, the value of the compensated pressure is also reduced and, in order to keep a desired amount of gas in the beverage, the $CO_2$ flow rate in the carbonation duct will be reduced.

With the above mentioned compensation, the process will equalize (making equal) the value of the compensated pressure with the carbonator tank's internal pressure.

In the conventional processes known in the state of art, the compensation due beverage temperature variations is done by expelling $CO_2$ to the atmosphere, which does not occur in the proposed process, wherein no $CO_2$ is expelled.

OBJECTIVES OF THE INVENTION

Present invention first objective is to provide a carbonation duct which increases the gas solubility in a beverage.

A second objective is to provide a carbonation process which reduces the gas losses during the steps of the process.

A third objective is to provide a structural configuration for the gas entry portion and for the beverage entry portion which increases the mixture between the beverage and gas.

A further objective is to provide a turbilionating projection in the carbonation duct, the turbilionating projection comprising a whirl wall to achieve increased gas dissolvability in the beverage when compared to the prior art solutions.

Present invention's further objective is to provide a carbonation duct with three well defined portions.

An additional objective is to provide a carbonation process which compensates the variation of pressure in the carbonator tank by controlledly managing the $CO_2$ flow rate that enters the carbonation duct and the $CO_2$ flow rate that enters the carbonator tank.

An additional objective is to provide a carbonation process which compensates the variations of the beverage temperature by controlledly managing the $CO_2$ flow rate that enters the carbonation duct and the $CO_2$ flow rate that enters the carbonator tank.

Further, another objective is to provide a carbonation process that does not expel $CO_2$ to the atmosphere in order to compensate variations of pressure in the carbonator tank and further variations of the beverage temperature.

An additional objective is to provide a carbonation process and a carbonation duct that keeps constant the volume of $CO_2$ solubilized in the beverage by managing the $CO_2$ flow rate that is added to the carbonator tank and to the carbonation duct.

A further objective is to provide a carbonation process that reintroduces the carbonated beverage in the carbonator tank in order to increase or decrease the $CO_2$ volume in the beverage.

BRIEF DESCRIPTION OF THE INVENTION

Present invention objectives are reached with a carbonation duct for blending a gas and a beverage, the carbonation duct comprising: a tubular structure surrounding a compression structure, the compression structure longitudinally positioned inside the tubular structure and setting a pathway for the flowing of the beverage along the carbonation duct.

The compression structure comprises external diameters sequentially defining a convergence path, a mixture path and a slowdown path along the carbonation duct, wherein, in the convergence path, the carbonation duct comprises a gas entry portion for gas injection in the pathway. The tubular structure defines a turbilionating projection establishing a carbonation duct mixture diameter.

BRIEF DESCRIPTION OF THE DRAWINGS

Present invention has been illustrated according to its preferred embodiment, which shows.

DETAILED DESCRIPTION OF THE PREFERRED EMBODIMENTS

Figure 1:
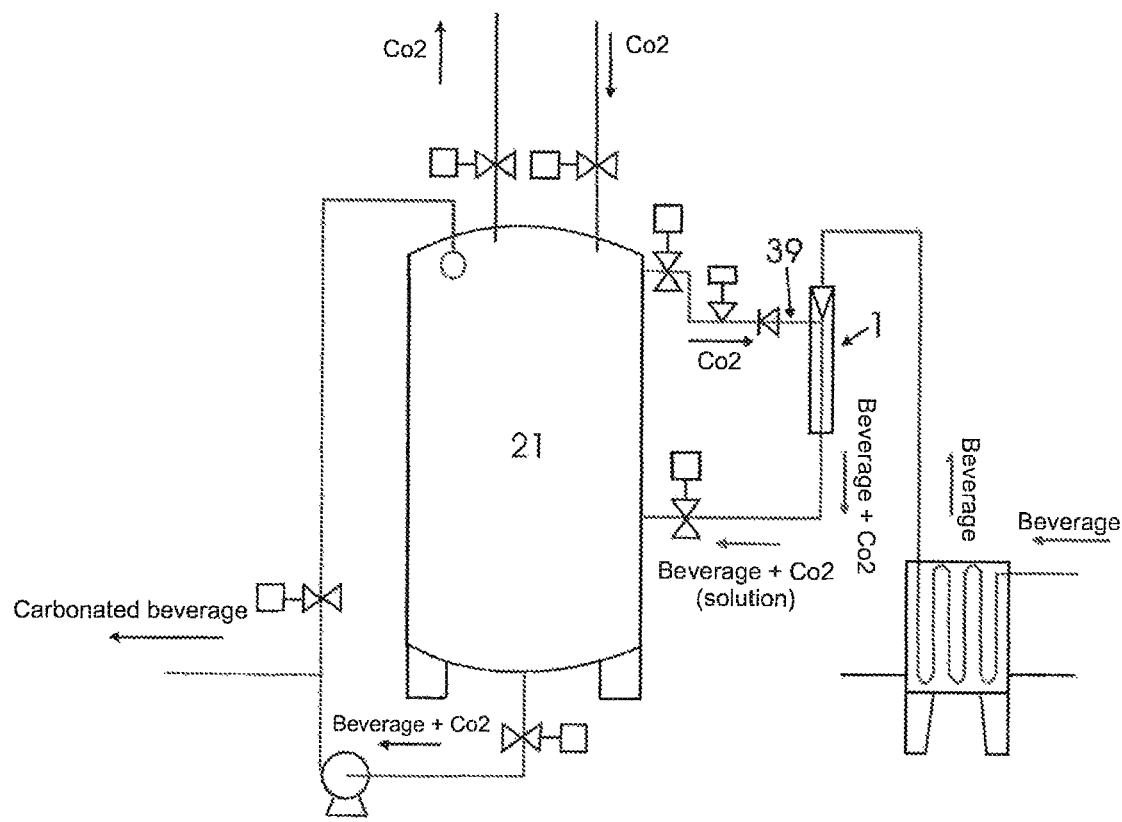
FIG. 1—is a block diagram representing the carbonation duct as proposed in present invention.

FIG. 1 is a block diagram representing the carbonation duct 1 as proposed in present invention.

The carbonation duct 1 as proposed is used to provide gas solubility in a beverage. By beverage, it can be understood any kind of drinkable liquid, and the gas used in the carbonation duct is, preferably carbon dioxide ($CO_2$). Still in reference to FIG. 1, it can be noted that the carbonation duct 1 is connected to a carbonator tank 21.

The length of the carbonation duct 1 should be determined according to its diameter, which depends from the amount (flow rate) of beverage that needs to be carbonated. In other words, the beverage flow rate determines the carbonation duct 1 diameter, which determines the carbonation duct length. The carbonation duct 1 diameter will be hereafter described as flowability diameter K.

The table below makes reference to FIG. 2 and represents a relation between the length of the carbonation duct 1, the flowability diameter K and the maximum beverage flow rate that needs to be carbonated:

| Beverage Flow Rate ($m^3$/h) | Flowability Diameter K (mm (inches)) | Carbonation Duct's Length (L1 + L2 + L3) |
| --- | --- | --- |
| 45 | 101.6 (4") | 840 mm |
| 35 | 76.2 (3") | 625 mm |
| 25 | 50.8 (2") | 400 mm |
| 12 | 25.4 (1") | 320 mm |

Figures 2, 3:
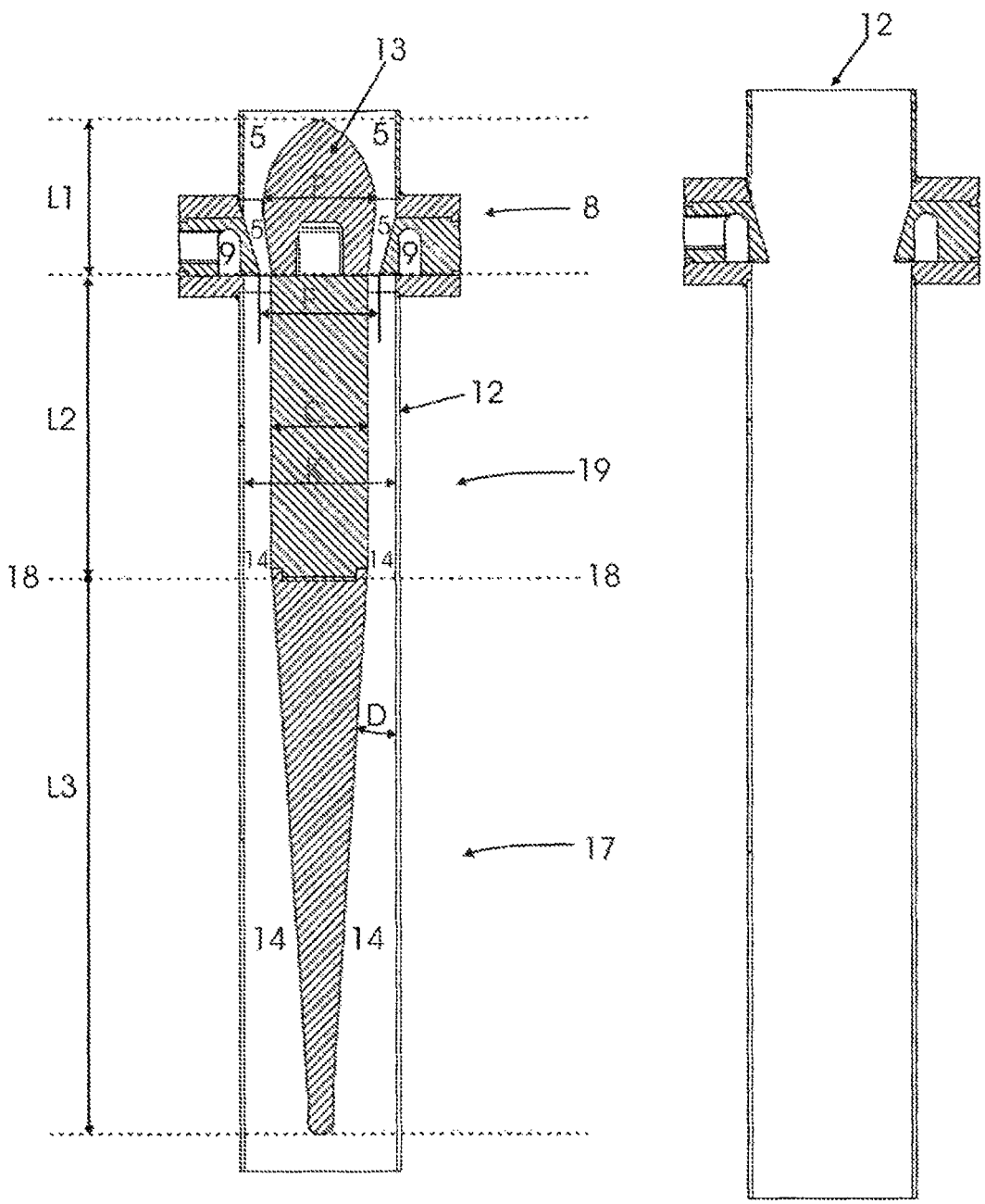
FIG. 2—is a cross sectional view of the carbonation duct as proposed in present invention.
FIG. 3—is a cross sectional view of the carbonation duct's external structure.

In reference to the carbonation duct 1 structural configuration, FIG. 2 is a cross sectional view of a preferred embodiment of the duct 1. For a better understanding, the proposed duct 1 will be segmented in three different well defined main portions, a convergence path 8, a mixture path 19 and a slowdown path 17.

Figure 4:
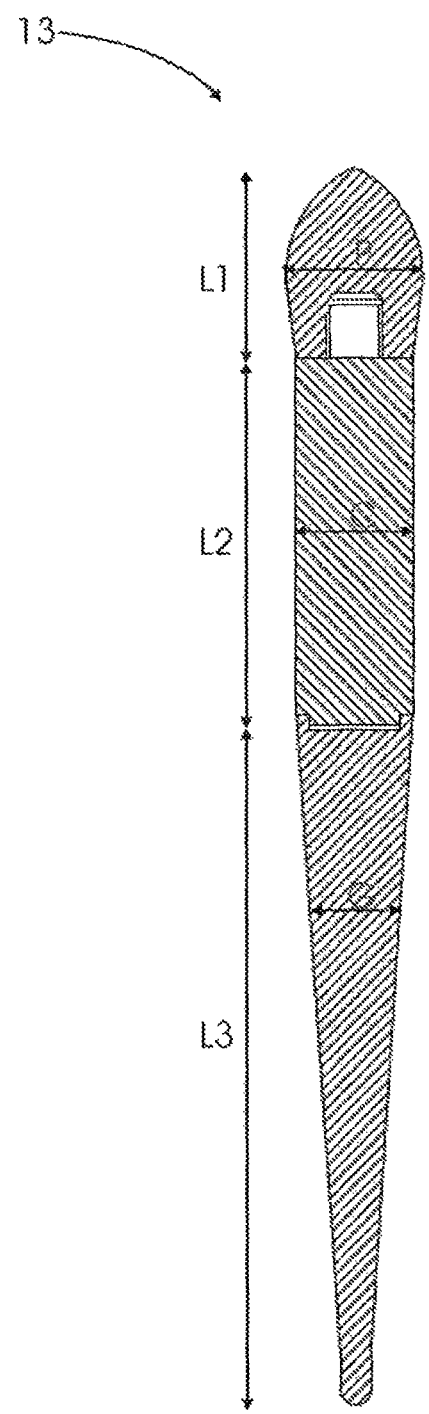
FIG. 4—is a cross sectional view of the carbonation duct's internal structure.

As can be seen from FIG. 2, the carbonation duct 1 as proposed in present invention comprises a tubular structure 12 (a hollow cylinder or any other suitable cross section) associated to a compression structure 13, such association sets a pathway 14 for the flowing of a solution, that is, beverage with gas (mixture path 19 and slowdown path 17) or without gas (convergence path 8). FIGS. 3 and 4 respectively illustrate the tubular structure 12 and the compression structure 13.

As can be seen especially from FIG. 2, the compression structure 13 is surrounded by the tubular structure 12 and is longitudinally positioned inside the structure 12. Further, the length L1 of the convergence path 8 is equivalent to the tubular structure internal diameter K (flowability diameter K), as can be better seen from FIG. 2.

The carbonation duct 1 further comprises a beverage entry portion 5 disposed in the convergence path 8. Such beverage entry portion 5 may be best seen from FIG. 2. Closer to the mixture path 19, the area of the pathway 14 of the entry portion 5 decreases, configuring a funnel shaped passage for the flowing of the beverage.

To achieve that configuration, the carbonation duct 1 comprises a turbilionating projection 10 from the tubular structure 12 in direction of the compression structure 13, such protuberance being configured as a planar ramp that protrudes inwardly from the tubular structure 12.

The turbilionating projection 10 further comprises a whirl wall 27 configured to potentiate the gas and beverage mixture. In this preferred embodiment of the carbonation duct 1, the whirl wall is configured as a concave surface and has a preferred whirl wall depth H of 1,3 mm. Further the whirl wall radius $R_1$ is preferably 4.5 mm. The whirl wall 27 can be better seen from FIGS. 5 and 6.

The whirl wall 27 is configured to generate a turbulence effect in the mixture path 19 and specifically in the area adjacent to the gas entry portion 9. Such turbulence allows the increment of the gas dissolvability (capacity of dissolution) in the beverage (over 7%), specifically, such increment occurs due the beverage acceleration and atomization as it contacts the gas.

Further, the proposed whirl wall radius $R_1$ reduces the pressure drop in the mixture path 19 (specifically in the area adjacent to the gas entry portion 9), since the contact area of the beverage and the compression structure 13 in the region of the narrowest passage of the pathway is minimum.

Figure 7:
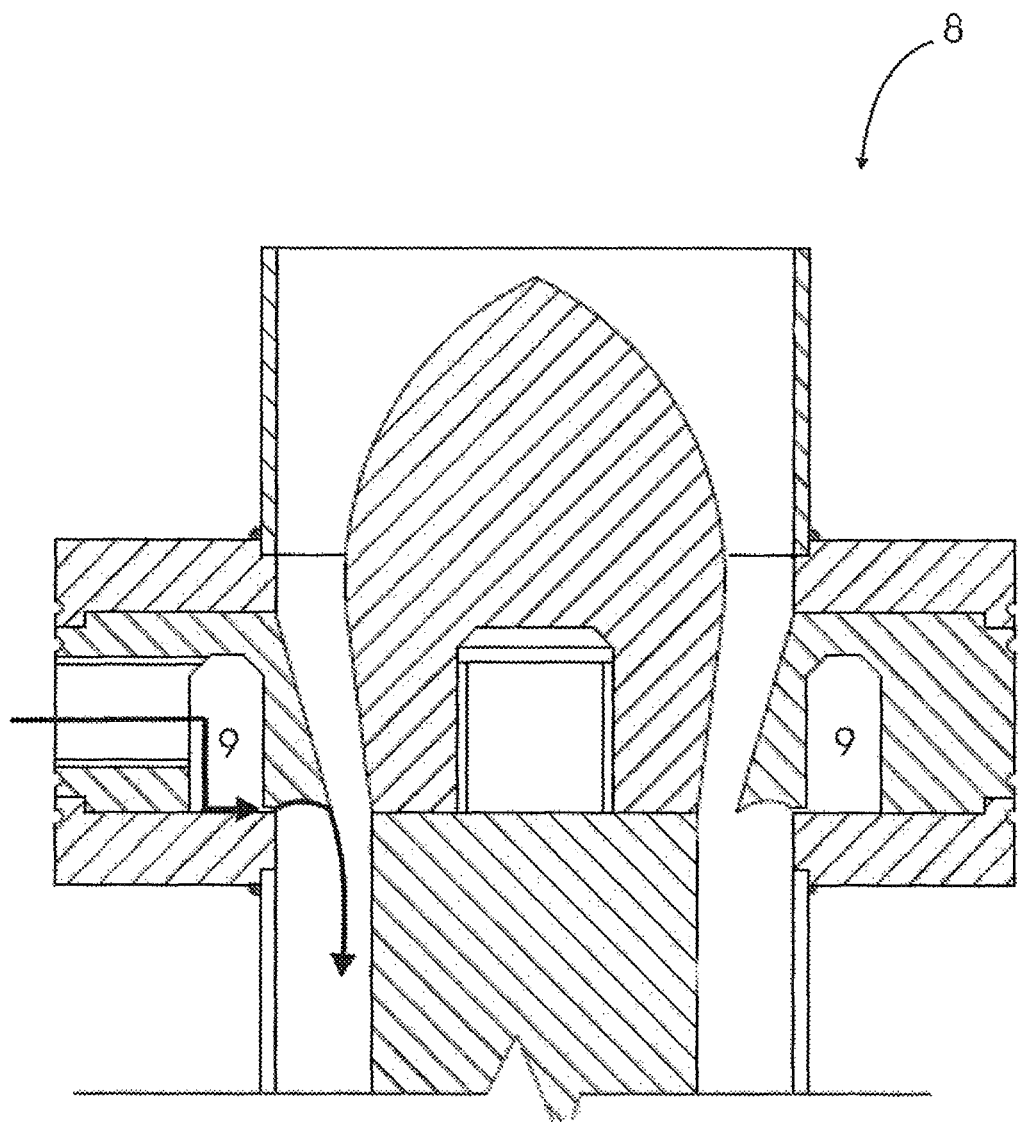
FIG. 7—is a cross sectional view of the carbonation duct proposed illustrating the gas flow as it enter the carbonation duct.

Additionally, the whirl wall radius $R_1$ allows the gas flow towards the beverage flux, as indicated in FIG. 7, so, avoiding the perpendicular gas flow entry and thus achieving the desired efficiency levels discussed above.

Figure 5:
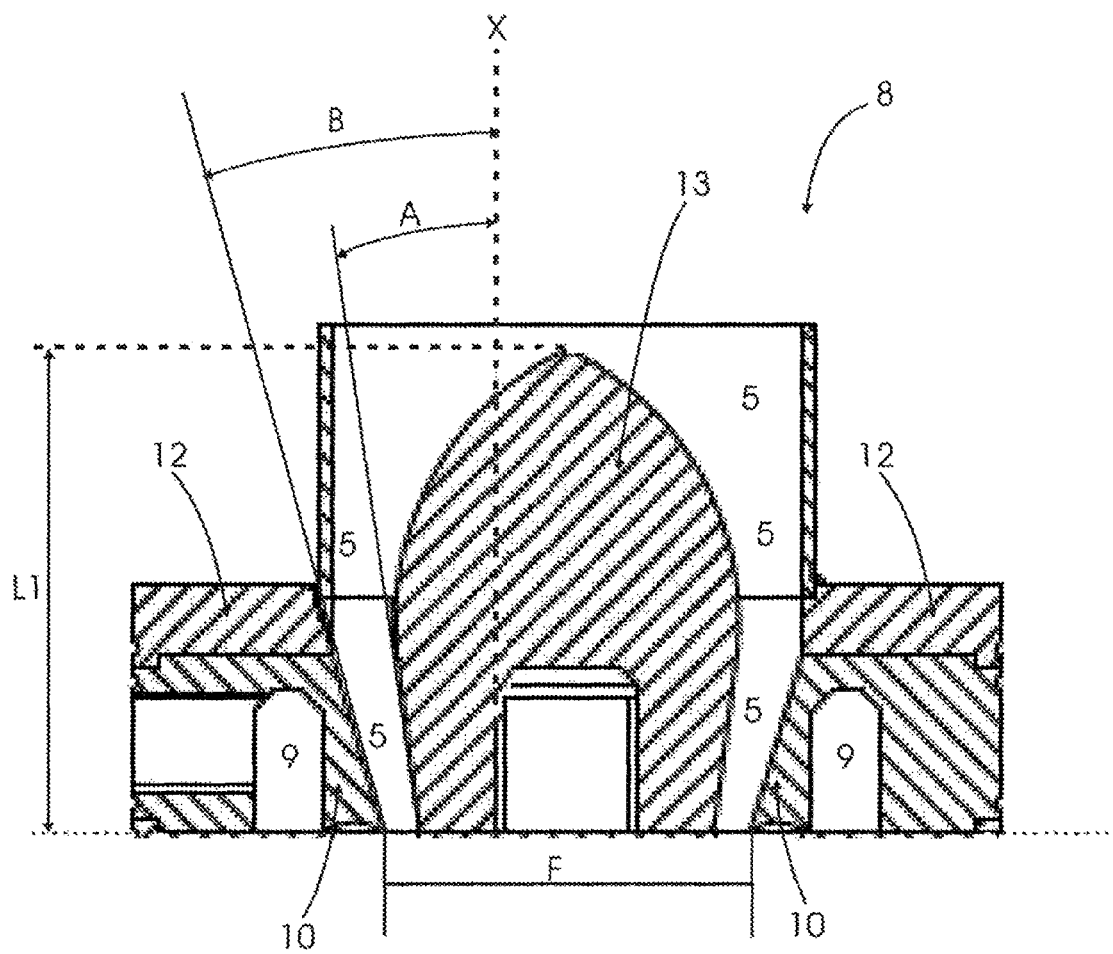
FIG. 5—is a cross sectional view of the carbonation duct's convergence path.
Figure 6:
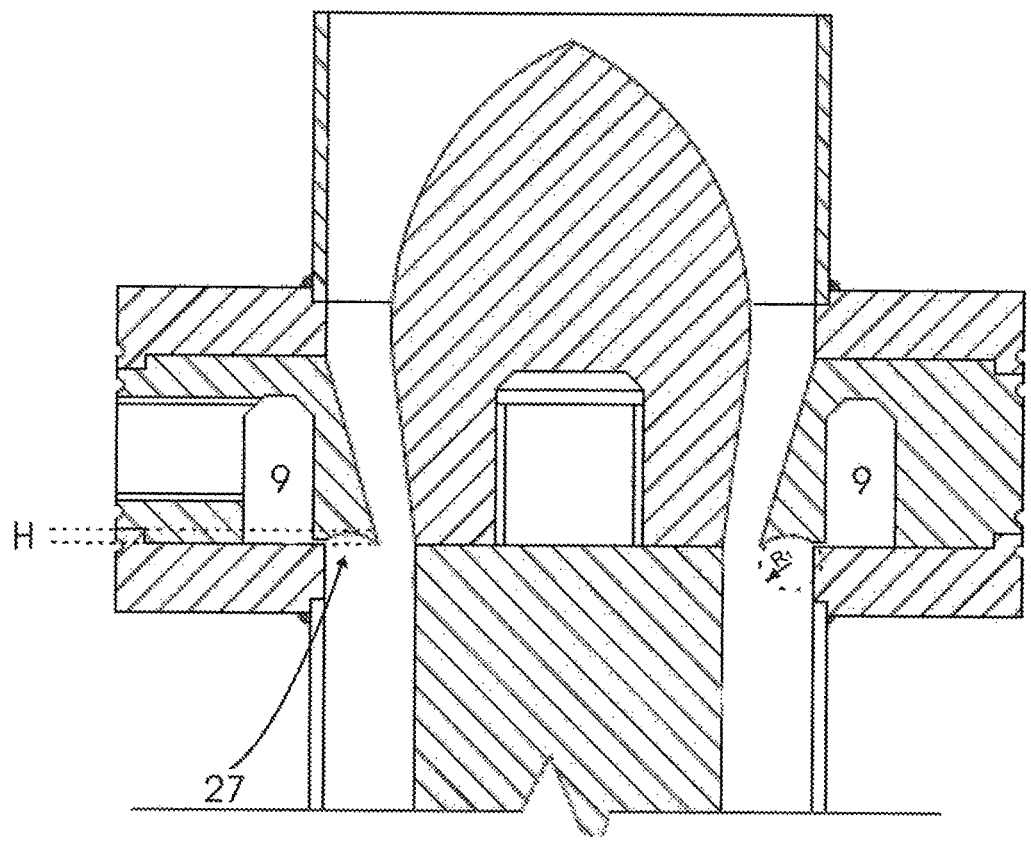
FIG. 6—is an additional cross sectional view of the carbonation duct's convergence path.

Back in reference to FIG. 5, it represents a cross sectional view of the convergence path 8 illustrating the elements mentioned above. The beverage entry portion 5 can be understood as being the area between the tubular structure 12 and the compression structure 13 that allows the flowing of a beverage.

For an appropriate entry of the beverage in the carbonation duct 1, a deviation angle A is set in the compression structure 13, as can be seen according to FIG. 5.

The deviation angle is measured from an internal axis (X) until the surface of the compression structure that establishes the pathway (14), as can be seen from FIG. 5.

The deviation angle A is not dependent from the beverage flow rate, and, in this preferred embodiment of the carbonation duct 1, the deviation angle A assumes a preferred value of approximately 8°. Obviously, such value represents just a preferred value, as, other magnitude for the deviation angle can be used, for example, a range from 5° to 10° is acceptable.

Still in reference to the convergence path 8, it comprises a maximum preferred diameter P that is 0,85 the value of the flowability diameter K (P=K*0,85)

From FIG. 5, and as already mentioned, it can be seen that the convergence path 8 comprises a turbilionating projection 10 from the tubular 12 to the compression structure 13 of the carbonation duct 1.

The turbilionating projection 10 defines a convergence angle B for the flowing of the beverage, specially, the convergence angle B is measured from the internal axis X of the compression structure 13 until the surface of the turbilionating projection 10 which defines the pathway 14, as can be seen from FIG. 5.

The angle B establishes a balance between the beverage flow speed and the drop of the beverage pressure as it flows in the area bounded by the convergence angle B.

In this preferred embodiment of the carbonation duct 1, the convergence angle B assumes a value of 13°. Like the deviation angle A, this is just a preferred value for the convergence angle B, and, a range from 8° to 15° would be acceptable.

The turbilionating projection 10 establishes a carbonation duct mixture diameter F, as can be better seen from FIG. 2.

For an appropriate configuration of the projection 10, the mixture diameter F should be 16 millimeters (mm) smaller than the tubular structure flowability diameter K, a tolerance of 0,1 mm can be admitted.

That 16 mm difference from the tubular structure diameter K allows a correct configuration for the convergence angle B, since by increasing the area of the pathway 14, a beverage turbulence is achieved.

That turbulence occurs as the beverage exits the area bounded by the turbilionating projection 10 and enters the mixture path 19. Such turbulence allows a high speed mixture between the beverage and the gas due the expansion generated in the beverage.

In the mixture path 19, the compression structure's 13 diameter should depend directly from the mixture diameter F, since the objective of the mixture path 19 is to set a determined drop in the beverage pressure following the Venturi concepts. In FIG. 2, the internal structure's diameter is represented by a mixture path diameter C.

Preferably, the ratio between the diameters C and F (C/F) should be between 0.65 and 0.75 (tolerance of 0,1 mm). In this preferably range, the carbonation process shows high efficiency, as for values greater than 0.75, the pressure drop would be considerably high.

For smaller values than 0.65, the beverage flow rate in the convergence path 8, and specifically in the turbilionating projection 10, would not be sufficient to generate a satisfactory level of vacuum (or negative pressure).

The ratio between the diameters C and F has the objective of increasing the beverage flow rate speed as it passes by the turbilionating projection 10 (neck of the carbonation duct), further, the proposed ratio sets an optimal relation between the beverage drop of pressure as it flows in the area of the turbilionating projection 10 and the level of vacuum (or negative pressure) generated.

The length L2 of the mixture path 19 should be such as to retain the beverage acceleration due to a predetermined period of time (retention time), establishing the proper gas volume in the beverage. In a preferred embodiment, the retention time is about 40 milliseconds (ms).

Knowing the retention time of 40 ms and the beverage flow rate, the length L2 of the mixture path 19 can be determined in relation to the pathway 14 area, as follows:

$$\text{Length}(L2) = \frac{\text{Flow rate} * \text{Retention Time}}{\text{Area}}$$

In reference to FIG. 2, in the mixture path 19, the area of the pathway 14 is kept constant and is determined by:

$$\text{Area} = \text{Diameter } K - \text{Diameter } C;$$

$$\text{Area} = \pi * r^2$$

It is valid to remember that the flowability diameter K depends to the beverage flow rate and to the carbonation duct 1 length.

Still relating to FIG. 2, it can be seen that the carbonation duct 1 further comprises a slowdown path 17 adjacent to the mixture path 19. The border portion between the slowdown path 17 and mixture path 19 is defined by a junction axis 18.

Starting from the junction axis 18, and along the slowdown path 17, the area of the pathway 14 gradually increases. The purpose of this increment is to achieve a progressive slowdown of the beverage flowing in the carbonation duct 1.

An instantaneous slowdown would increase the kinetic energy in the gas soluble in the beverage, resulting in an abrupt gas discharge. The structural configuration of the compression structure 13 and the tubular structure 12 establishes a divergence angle D, which assumes a maximum value of 9°. A minimum value of 4,5° would be accepted, thus any angle within that range can be used.

Figure 8:
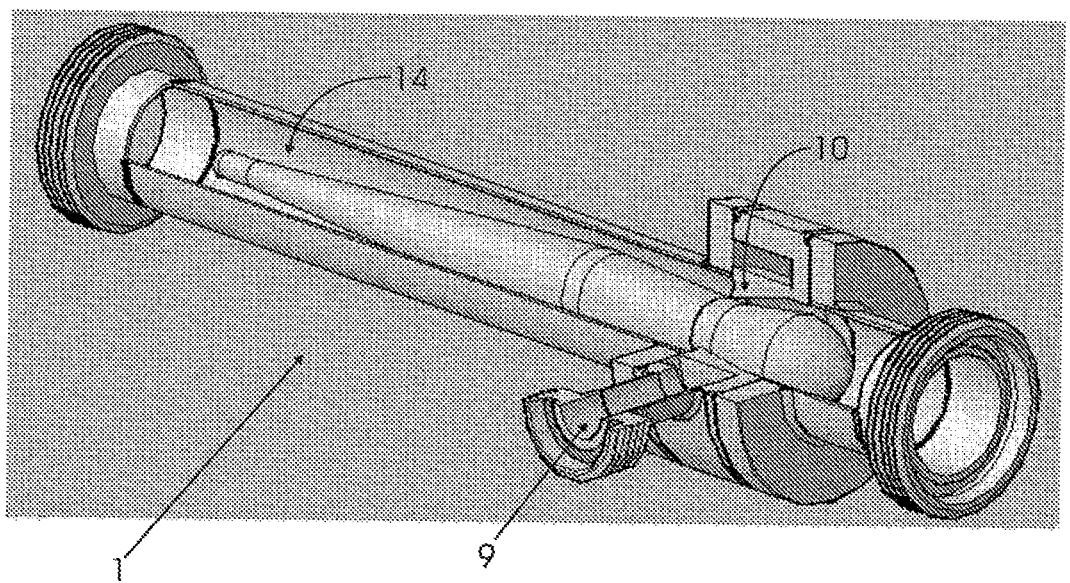
FIG. 8—represents a perspective cross sectional view of the gas entry portion of the carbonation duct proposed in the present invention.

FIG. 8 represents a perspective cross sectional view of the gas entry portion 9 of the carbonation duct 1 proposed in the present invention. It can be seen that the gas entry portion 9 is disposed adjacent to the pathway 14, specifically, in a region of the carbonation duct 1 comprising the smallest area of the pathway 14.

In reference to the gas entry portion 9, the gas flow rate in the portion 9 should allow the gas flowing rate requested by the system. Specifically regarding the carbonation duct 1, the pressure drop in the duct 1 should not affect the gas flow rate.

As an example, considering 0,7 MPa (7 bar) of gas pressure at the gas entry portion 9, the maximum admissible pressure drop should be around 1.5% of the "pressure of project", thus the maximum admissible pressure drop is 0,01 MPa (0.1 Bar).

Knowing the maximum admissible pressure drop, the minimum gas entry portion area can be determined in reference to the following elements:

Maximum beverage flow rate of the carbonation duct 1 and of the carbonation system: $Q_{MAX}$ Maximum volume of gas in a beverage: $V_{CO2MAX}$. It represents the maximum volume of gas that should be diluted in the beverage and a relation between the carbonated beverage volume and the gas volume dissolved at atmospheric pressure. For a bottle of 100cm³ in 3 Volumes of $CO_2$, 300 cm³ of $CO_2$ should be dissolved at atmospheric pressure.

Maximum gas flow rate: $Q_{GMAX}$. It represents the maximum gas consumption rate, depending on the maximum gas volume that should be dissolved in the beverage according to the maximum beverage flow rate $Q_{MAX}$, in other words, $Q_{GMAX}=V_{CO2MAX}*Q_{MAX}$.

Maximum pressure of the carbonation duct 1: $P_{MAX}$. To increase the amount of gas dissolved in the beverage, it is necessary to increase the gas pressure in the gas entry portion 9, since, when the pressure is increased, the gas volume that flows in the entry portion 9 is also increased.

The internal diameter of the gas entry portion 9 can be achieved using the Darcy-Weisbach expression:

$$\Delta p = \frac{\mu * l * v^2}{\frac{\pi d}{\rho}};$$

wherein:
l: duct length (m); d: duct internal diameter; v: air velocity; Δp: Pressure Drop; μ: friction coefficient and ρ: density (kg/m³).

As the "pressure of project" is 0,7MPa (7 bar), the value of $\Delta_p$ is 0,01 MPa (0.1 Bar) (1.5% of 7 Bar). $v_{CO2MAX}$ can be established as 6 (relation between the carbonated beverage volume and the gas volume dissolved at atmospheric pressure).

The maximum beverage flow rate ($Q_{MAX}$) of the carbonation duct 1 is determined considering a 101,6 mm (4 inch) duct, through conducted experiments, a $Q_{MAX}$ of 0.75 m³/min was reached. So, a maximum gas flow rate ($Q_{GMAX}$) of 4.5 m³/min is achieved. Further, a length of 0.3 meters is used (tube that connects the tank 21 to the duct 1, indicated with the reference 39 in FIG. 1).

By the Darcy-Weisbach expression, a minimum diameter of 14.2 mm is achieved, consequently, an area of 158.28 mm² is determined.

Knowing the area, the height of the gas entry portion 9 can be determined as below:

Height=Area/Perimeter, wherein

Area=158.28 mm² and the perimeter=Diameter K*π. So, the gas entry portion 9 height is equal to 0.57 mm.

The gas entry portion 9 height is the dimension between the compression structure 13 and the closest point of the turbilionating projection 10 to the compression structure 13 (the entry of $CO_2$ in the duct 1 occurs in an annular way).

Having described a preferred embodiment for the carbonation duct 1, the steps of the carbonation process which increases the gas solubility in the beverage and reduces the gas losses will be described.

Figure 9:
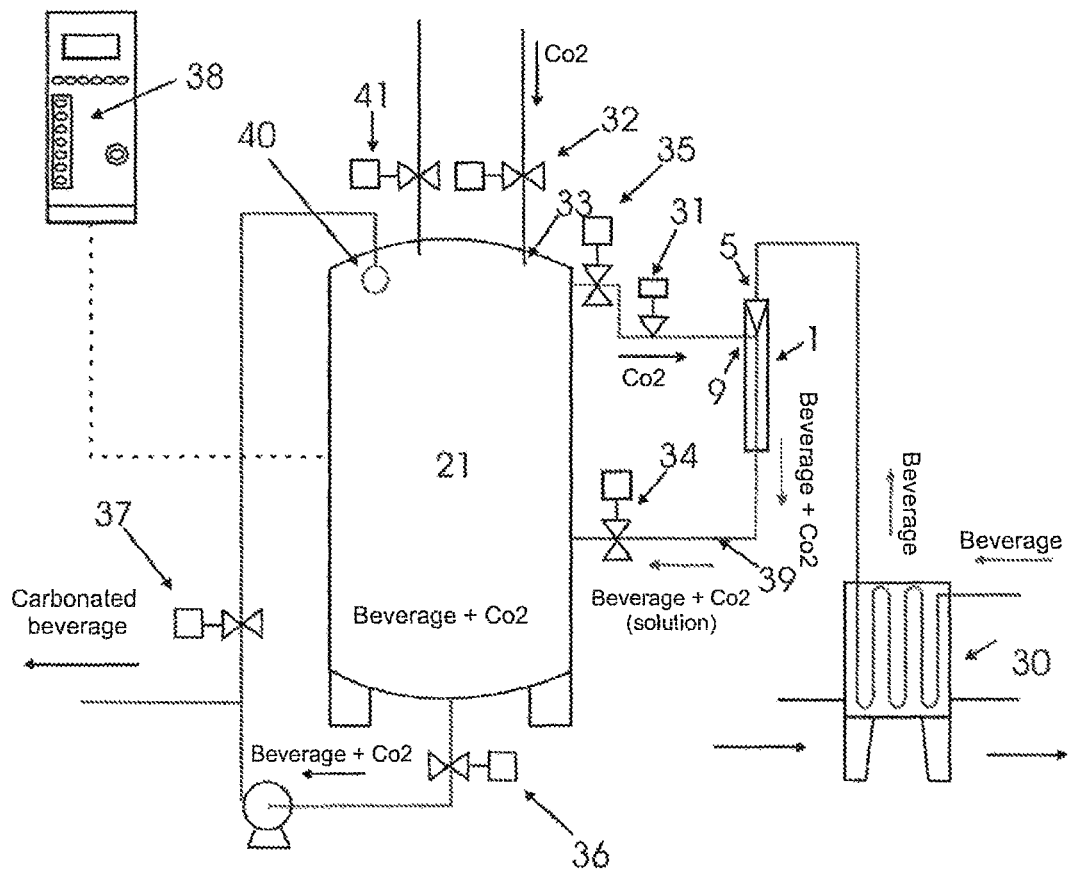
FIG. 9—it is a representation of a carbonation system wherein the proposed carbonation duct is used.

For a better understanding of the carbonation process proposed in present invention, FIG. 9 will be used as reference. In such figure, the main components are the carbonation duct 1 as described before, the carbonator tank 21, an evaporator 30 and a plurality of valves 31, 32, 33, 34, 35 and 37 which their operation will be better described in sequence.

Further, the proposed carbonation process will refer to two main terms, a compensated pressure $P_C$ and a carbonator tank pressure $P_R$.

The compensated pressure $P_C$ is the desired pressure for achieving a desired gas volume in the beverage. Such compensated pressure $P_C$ is determined by the user responsible of performing the carbonation process.

The carbonator tank pressure $P_R$ is the real pressure measured in the carbonator tank 21.

Basically, the carbonation process proposed herewith compensates the carbonator tank pressure $P_R$ variations and the compensated pressure $P_C$ variations by just controlling the operation (percentage of opening) of the modulating valve 31 (therefore controlling the $CO_2$ flow rate that enters in the carbonation duct 1) and by controlling the $CO_2$ flow rate that enters the carbonator tank 21.

So, in the proposed process, and differently from the prior art teachings, no $CO_2$ is expelled to the atmosphere.

Further, in the proposed process, and due the controlling of the $CO_2$ flow rate that enters in the carbonation duct 1 and in the carbonator tank 21, the process aims to always equalize (make equal) the value of the compensated pressure $P_C$ with the value of the carbonator tank pressure $P_R$.

Regarding the compensated pressure $P_C$, the only factor that can affect it during the process is the beverage temperature:

Compensation Due Temperature Variations

The beverage temperature should be controlled before its entry in the carbonation system. As can be seen from FIG. 9, an evaporator 30 is used to manage the beverage temperature.

The preferred beverage temperature in the entry of the carbonation duct 1 is 4° C. This value provides a greater efficiency in the carbonation process.

However, if for any reason the beverage temperature varies (increase or decrease) before entering the carbonation duct 1, the proposed process automatically compensates such variation, as will be described below.

Considering a scenario wherein the beverage temperature is 4° C. and the carbonation process is normally being performed, with the value of the compensated pressure $P_C$ equal to the value of the carbonator tank pressure $P_R$.

If the beverage temperature increases during the carbonation process, such increment will also increase the value of the compensated pressure $P_C$ but the value of the carbonator tank pressure $P_R$ will not be affected. Consequently, in this scenario, $P_C$ would be greater than $P_R$.

So, in order to compensate such variation, the proposed process automatically adds $CO_2$ in the carbonator tank 21 until both pressures are equalized, in other words, the $CO_2$ control valve 32 is opened and the carbonator tank pressure $P_R$ will be equal to the compensated pressure $P_C$. The $CO_2$ control valve will be opened proportionally according to the increment in the beverage temperature.

It is important to mention that in an optimal scenario, that is, being the carbonator tank pressure $P_R$ equalized with the compensated pressure $P_C$ ($P_R=P_C=4$ kg/cm$^2$), the $CO_2$ control valve should be closed. By adding $CO_2$ in the tank 21, the value of the carbonator tank pressure $P_R$ will increase and consequently equalized (being equal) to the value of the compensated pressure $P_C$.

If, for any reason, the beverage temperature decreases, such decrement will also decrease the value of the compensated pressure $P_C$, but the carbonator tank pressure $P_R$ will not be affected.

In order to compensate such variation, the $CO_2$ flow rate that is added in the carbonation duct 1 should be decreased, consequently, the modulating valve 31 should be closed (percentage of opening is reduced).

The table below shows preferred values for the modulating valve percentage of opening considering a decrement in the beverage temperature and consequently a decrement in the value of the compensated pressure $P_C$.

| Values for the compensated pressure $P_C$ (Kg/cm$^2$) (considering a pressure $P_R$ in the tank of 4 kg/cm$^2$) | Modulating valve % of opening |
| --- | --- |
| 4.0 | 80 |
| 3.9 | 76 |
| 3.8 | 72 |
| 3.7 | 70 |
| 3.6 | 65 |

With the reduction of the modulating valve 31 percentage of opening, the pressure in the tank $P_R$ will be equalized with the compensated pressure $P_C$, setting the process in the desired scenario.

The beverage flow rate in the carbonation duct 1 entry portion (beverage entry portion 5) should be constant (stable), since the carbonation duct 1 structural configuration is dimensioned according to the desired beverage bottling, and, the carbonation duct 1 diameter is kept constant (diameter C).

If small changes in the beverage flow rate occur in the beverage entry portion 5, the vacuum in the carbonation duct 1 would decrease or increase proportionally. Such variation in the vacuum allows a small compensation in the blending of beverage and gas, since the $CO_2$ flow rate would increase or decrease in the carbonation duct 1.

If the beverage flow rate decreases considerably, the beverage in the carbonation duct 1 would not achieve turbulence as it flows by the turbilionating projection 10. Further, with an undesired beverage flow rate, there would not be vacuum in the gas entry portion 9 and consequently the carbonation process would not occur as it should.

To start the process, after the value of the compensated pressure $P_C$ has been set, it necessary to add the desired amount of $CO_2$ in the carbonator tank 21, for this, the $CO_2$ control valve 32 should be opened and then beverage should be added in the tank 21.

As mentioned before, in the proposed process, the compensated pressure $P_C$ should always be equal to the pressure measured in the tank 21 (carbonator tank pressure $P_R$).

It is important to mention that the pressure in the tank 21 (carbonator tank pressure $P_R$) is preferably measured at the upper portion of the tank 21, indicated with the reference 33 in FIG. 9. The pressure $P_R$ can be shown in a control panel 38 disposed near the system disclosed in FIG. 9. Any method known in the art of measuring the pressure of a compartment could be used.

In order to add beverage in the tank 21, the beverage control valve 34 should be opened. As the beverage passes through the evaporator 30, its temperature decreases and reaches 4° C. (preferred to mperature).

As the beverage control valve 34 is opened, the Venturi valve 35 and the modulating valve 31 should be kept 80% opened to control the gas flow rate in the carbonation duct 1. Further, as the beverage enters the carbonator tank 21, it solubilizes $CO_2$ by the carbonation duct 1.

To ensure that just $CO_2$ will be added in the carbonator tank 21, the Venturi valve 35 is placed at 90% of the height of the tank 21. If such valve 35 was placed above this level (or even outside the tank 21), there would be the possibility of adding air in the carbonator tank 1, since air is lighter than $CO_2$, it is disposed in the upper portion of the carbonator tank 21.

Compensation Due Carbonator Tank Pressure $P_R$ Variations

The entry of beverage in the tank 21 consequently increases the carbonator tank pressure $P_R$, making it greater than the compensated pressure $P_C$.

To avoid that such increment affect the $CO_2$ flow rate in the duct 1, and further to equalize the pressure in the tank $P_R$ with the compensated pressure $P_C$, the modulating valve 31 is gradually closed following an expression related to $CO_2$ oscillations at distinct pressures.

Table below represents preferred values for the carbonator tank pressure $P_R$ and the corresponding preferred percentage of the modulate valve 31 opening (illustrative values) considering a compensated pressure of 4 kg/cm$^2$.

As can be seen, and as already mentioned, as the real pressure in the tank ($P_R$) increases, the modulating valve 31 percentage of opening decreases (valve is closed):

| Carbonator tank Pressure $P_R$ (Kg/cm$^2$) (Considering a compensated pressure $P_C$ of 4 Kg cm/2) | Modulating valve 31 (% of opening) |
| --- | --- |
| 4 | 80 |
| 4.3 | 76 |
| 4.7 | 71 |
| 5 | 68 |
| 5.1 | 62 |
| 5.3 | 58 |

By closing the modulating valve 31, the carbonator tank pressure $P_R$ would be equalized with the compensated pressure $P_C$.

As the process solubilizes the $CO_2$ in the beverage, the carbonator tank pressure $P_R$ may start to decrease, while the compensated pressure $P_C$ will not be affected.

In order to compensate such pressure drop, the $CO_2$ control valve 32 may be opened to avoid that the tank 21 reaches it minimum allowable pressure and also to manage the $CO_2$ flow rate in the duct 1. In order words, the $CO_2$ flow rate that is added in the tank 21 should be increased.

As already mentioned, being the compensated pressure $P_C$ equalized with the carbonator tank pressure $P_R$, the $CO_2$ control valve 32 should be closed. Consequently, if the pressure inside the tank $P_R$ decreases, the $CO_2$ control valve 32 will be opened proportionally according to the decrement in the tank $P_R$ pressure.

The addition of $CO_2$ in the tank 21 would increase the carbonator tank pressure $P_R$ and consequently equalize the pressure $P_R$ with the compensated pressure $P_C$. When both pressures are equalized the $CO_2$ control valve 32 will be closed again If any abrupt pressure drop in the value of the carbonator tank pressure $P_R$ occurs, of if the pressure $P_R$ reaches a value 10% (in this case 3,6 $Kg/cm^2$) lower the value of the compensated pressure $P_C$, the process may also increase the percentage of opening of the modulating valve 31 in order to faster equalize it with the compensated pressure $P_C$.

For values lesser than 3,6 $Kg/cm^2$ (for pressure drops greater than 10%), the carbonation process should be immediately interrupted. In this sense, when the pressure in the carbonator tank $P_R$ considerably or abruptly drops, the modulating valve 31 works as a support for the $CO_2$ control valve.

So, in optimal conditions, that is, being the compensated pressure $P_C$ equalized with the pressure inside the carbonator tank $P_R$, the modulating valve 31 is kept 80% opened and the $CO_2$ control valve 32 is kept closed. As mentioned before, the $CO_2$ control valve will just be opened if the carbonator tank pressure $P_R$ reaches a value lesser than the value of the compensated pressure $P_C$.

The beverage level in the carbonator tank 21 should always stay between 50% and 90% of the tank 21 height (tank 21 volume). When the beverage level is below 50%, beverage control valve 34 should be opened, and the carbonation process is started. When the carbonator tank 21 level reaches 90% (point wherein the Venturi Valve (35) is disposed) the beverage control valve 34 is closed and the beverage input is interrupted.

Before sending the beverage to bottling, the $CO_2$ and Brix (sugar dissolved in the beverage) levels needs to be checked. If they are within predicted standards, discharge valve 36 is opened.

The way the Brix level is checked is not present invention's main aspect, it can be done, for example, by refraction.

Additionally, if the $CO_2$ volume in the solution is not in accordance with standard parameters, it will be necessary to recirculate the beverage. By recirculate, it means that the beverage should be discharged from the tank 21 by opening the discharge valve 36 and then reintroduced in the tank 21 by opening the recirculation valve 37 and the spray ball 40.

As the beverage is reintroduced in the tank 21 by the spray ball 40, the beverage recarbonation is possible, or, it is also possible to remove the $CO_2$ from the beverage.

In other words, it is possible to increase or decrease the $CO_2$ level (volume) in the blended beverage (solution) by managing the spray ball 40 percentage of opening.

If it is desired to decrease the $CO_2$ volume in the beverage, it is necessary to decrease the value of the compensated pressure $P_C$. On the other hand, if it is desired to add more $CO_2$ in the beverage, the compensated pressure $P_C$ should also be increased.

The spray ball 40 is a stainless sphere that has small orifices around its surface to blast beverage in the tank 21. Such element (spray ball 40) avoids the waste of the carbonated beverage if the carbonation process did not occur as intended, as it can increase or decrease the $CO_2$ levels by recirculating the beverage.

The spray ball 40 control is done by managing the recirculation valve 37 and a bottling valve (not shown) that is disposed in the entry of the bottling process.

For example, if the $CO_2$ volume is above a predetermined level, the compensated pressure $P_C$ should be reduced and the carbonated beverage should be reintroduced in the tank 21, as mentioned above.

Further, if the $CO_2$ levels are below a predetermined level, the compensated pressure $P_C$ should be increased and the carbonated beverage should be reintroduced in the tank by the spray ball 40 until the desired $CO_2$ level is reached.

The $CO_2$ level in the beverage is measured after the beverage has been bottled. By shaking a sample of a bottlered beverage, the pressure inside the bottle will increase, the relation between such increment of pressure, the beverage temperature and the gas volume dissolved in the beverage will determine the $CO_2$ level in the beverage.

The recirculation time depends of the $CO_2$ level in the beverage and the $CO_2$ volume to be reached. During the recirculation, it is necessary to set the $CO_2$ volume and, according to it, the recirculation time will be estimated. According to the recirculation time, the ratio between the recirculation time and the $CO_2$ increment volume in the beverage can be determined.

As already mentioned above, during the beverage recirculation, it may be possible to increase or drop the compensated pressure $P_C$ according to the bottled $CO_2$ volume. If the volume is low, the compensated pressure $P_C$ is increased, otherwise, the compensated pressure $P_C$ is reduced.

The changes in the compensated pressure $P_C$ can be made using a control panel 38. A preferably representation of such panel 38 is represented in FIG. 9. The connection between the panel 38 and the tank 21 is not the main aspect of this invention and can be performed by any of the many techniques already known.

As described, with the carbonation duct and carbonation process as proposed in present invention, there is no necessity to discard $CO_2$ (vent) to the atmosphere in order to compensate pressure variations in the carbonator tank 21 and further to compensate beverage temperature variations.

In the proposed process and duct, the $CO_2$ is only discarded to the atmosphere in regular period of times, for example, every 3 minutes in order to remove the air trapped at the upper portion of the tank 21. This is done by managing the security valve 41 (FIG. 9).

In fact, in an alternative embodiment, an equipment to remove the air from the beverage could be disposed before the evaporator 30, in this case, there would be no necessity to expel $CO_2$ to the atmosphere.

The proposed process and its controlling of the mentioned valves are preferably automatically controlled by a Human Machine Interface (HMI), consequently, the equalization between the pressure inside the carbonator tank PR and the compensated pressure $P_C$ is done almost instantly, so, the proposed process will not sense any pressure variations for a long period of time.

The details of such HMI are not necessary to be described since it is not the main aspect of present invention. Any HMI able to manage valves known in the prior art teachings could be used. In an alternative embodiment, the method could be manually operated.

Finally, the beverage mentioned in present application should be understood as any material with a viscosity equal or inferior to 0,08 Pa. s (80 cPs).

Preferred embodiments having been described, one should understand that the scope of the present invention embraces other possible variations, being limited only by the contents of the accompanying claims, which include the possible equivalents.

The invention claimed is:

1. A carbonation duct (1) for blending a gas and a beverage, the carbonation duct (1) comprising:
   a tubular structure (12) surrounding a compression structure (13), the compression structure (13) longitudinally positioned inside the tubular structure (12) and setting a pathway (14) for the flowing of the beverage along the carbonation duct (1),
   wherein the compression structure (13) comprises external diameters (P,C,G) sequentially defining a convergence path (8), a mixture path (19) and a slowdown path (17) along the carbonation duct (1), wherein,
   in the convergence path (8), the carbonation duct (1) comprises a gas entry portion (9) for gas injection in the pathway (14), and
   the tubular structure (12) defines a turbilionating projection (10) establishing a carbonation duct (1) mixture diameter (F), wherein the turbilionating projection (10) comprises a whirl wall (27), the whirl wall (27) configured as a concave surface.

2. The carbonation duct (1) according to claim 1, wherein the tubular structure (12) comprises, in the majority of its length, a flowability diameter (K) greater than the mixture diameter (F) of the carbonation duct (1).

3. The carbonation duct (1) according to claim 2, wherein in the convergence path (8) the carbonation duct (1) comprises a beverage entry portion (5) having a deviation angle (A) for the flowing of the beverage, the deviation angle (A) formed in the compression structure (13) and measured from an internal axis (X) of the compression structure (13) until the surface of the compression structure (13) that establishes the pathway (14).

4. The carbonation duct (1) according to claim 3, wherein the turbilionating projection (10) defines a convergence angle (B) for the flowing of the beverage, the convergence angle (B) measured from the internal axis (X) of the compression structure (13) until the surface of the turbilionating projection (10) that establishes the pathway (14).

5. The carbonation duct (1) according to claim 4, wherein the slowdown path (17) defines a divergence angle (D) between the tubular structure (12) and the compression structure (13).

6. The carbonation duct (1) according to claim 5, wherein along the slowdown path (17), and starting from a junction axis (18), the area of the pathway (14) gradually increase.

7. The carbonation duct (1) according to claim 6, wherein in the mixture path (19) the area of the pathway (14) is kept constant.

8. The carbonation duct (1) according to claim 7, wherein the deviation angle (A) is in a range of 5° to 10°.

9. The carbonation duct (1) according to claim 8, wherein the convergence angle (B) is in the range of 8° to 15°.

10. The carbonation duct (1) according to claim 9, wherein the ratio between the mixture path diameter (C) and the mixture diameter (F) is in the range of 0.65 and 0.75.

11. The carbonation duct (1) according to claim 10, wherein the divergence angle (D) is in the range of 4.5° to 9°.

12. The carbonation duct (1) according to claim 11, wherein the convergence path (8) length (L1) is equal to the tubular structure flowability diameter (K).

13. The carbonation duct (1) according to claim 12, wherein the gas entry portion (9) is disposed adjacent to the pathway (14), in a region of the carbonation duct (1) comprising the smallest area of the pathway (14).

14. The carbonation duct (1) according to claim 13, wherein the whirl wall (27) is configured to generate a turbulence, in the mixture path (19), between the gas and the beverage.

15. The carbonation duct (1) according to claim 14, wherein the whirl wall depth (H) is 0.5 mm to 2.0 mm and the whirl wall radius ($R_1$) is between 2.0 mm to 7.0 mm.

16. The carbonation duct (1) according to claim 15, wherein the maximum diameter (P) is 0.85 times the value of the flowability diameter (K).

17. Carbonation duct according to claim 1, wherein the turbilionating projection (10) is configured as a planar ramp projection protruding inward from the tubular structure (12) towards the compression structure (13).

18. Carbonation duct according to claim 17, wherein the whirl wall (27) is the downstream edge of the protruding ramp which constitutes the turbilionating projection (10), which is concave with respect to the body of the ramp.

19. A carbonation duct (1) for blending a gas and a beverage, the carbonation duct (1) comprising:
   a tubular structure (12) surrounding a compression structure (13), the compression structure (13) longitudinally positioned inside the tubular structure (12) and setting a pathway (14) for the flowing of the beverage along the carbonation duct (1),
   wherein the compression structure (13) comprises external diameters (P,C,G) sequentially defining a convergence path (8), a mixture path (19) and a slowdown path (17) along the carbonation duct (1), wherein,
   in the convergence path (8), the carbonation duct (1) comprises a gas entry portion (9) for gas injection in the pathway (14), and
   the tubular structure (12) defines a turbilionating projection (10) establishing a carbonation duct (1) mixture diameter (F), wherein the turbilionating projection (10) comprises a whirl wall (27), the whirl wall (27) configured as a concave surface,
   wherein the turbilionating projection (10) is configured as a planar ramp projection protruding inward from the tubular structure (12) towards the compression structure (13) and the whirl wall (27) is the downstream edge of the protruding ramp which constitutes the turbilionating projection (10), which is concave with respect to the body of the ramp.

20. A carbonation duct (1) for blending a gas and a beverage, the carbonation duct (1) comprising:
   a tubular structure (12) surrounding a compression structure (13), the compression structure (13) longitudinally positioned inside the tubular structure (12) and setting a pathway (14) for the flowing of the beverage along the carbonation duct (1),
   wherein the compression structure (13) comprises external diameters (P,C,G) sequentially defining a convergence path (8), a mixture path (19) and a slowdown path (17) along the carbonation duct (1), wherein, in the convergence path (8), the carbonation duct (1) comprises a gas entry portion (9) for gas injection in the pathway (14), and the tubular structure (12) defines a turbilionating projection (10) establishing a carbonation duct (1) mixture diameter (F), wherein the tubular structure (12) comprises, in the majority of its length, a flowability diameter (K) greater than the mixture diameter (F) of the carbonation duct (1), wherein in the convergence path (8) the carbonation duct (1) comprises a beverage entry portion (5) having a deviation angle (A) for the flowing of the beverage, the deviation angle (A) formed in the compression structure (13) and measured from an internal axis (X) of the compression structure (13) until the surface of the compression structure (13) that establishes the pathway (14), wherein the turbilionating projection (10) defines a convergence angle (B) for the flowing of the beverage, the convergence angle (B) measured from the internal axis (X) of the compression structure (13) until the surface of the turbilionating projection (10) that establishes the pathway (14), wherein the turbilionating projection (10) comprises a whirl wall (27), the whirl wall (27) configured as a concave surface.

21. The carbonation duct (1) according to claim 20, wherein the slowdown path (17) defines a divergence angle (D) between the tubular structure (12) and the compression structure (13).

22. The carbonation duct (1) according to claim 21, wherein along the slowdown path (17), and starting from a junction axis (18), the area of the pathway (14) gradually increase.

23. The carbonation duct (1) according to claim 22, wherein in the mixture path (19) the area of the pathway (14) is kept constant.

24. The carbonation duct (1) according to claim 23, wherein the deviation angle (A) is in a range of 5° to 10°.

25. The carbonation duct (1) according to claim 24, wherein the convergence angle (B) is in the range of 8° to 15°.

26. The carbonation duct (1) according to claim 25, wherein the ratio between the mixture path diameter (C) and the mixture diameter (F) is in the range of 0.65 and 0.75.

27. The carbonation duct (1) according to claim 26, wherein the divergence angle (D) is in the range of 4.5° to 9°.

28. The carbonation duct (1) according to claim 27, wherein the convergence path (8) length (L1) is equal to the tubular structure flowability diameter (K).

29. The carbonation duct (1) according to claim 28, wherein the gas entry portion (9) is disposed adjacent to the pathway (14), in a region of the carbonation duct (1) comprising the smallest area of the pathway (14).

30. The carbonation duct (1) according to claim 29, wherein the whirl wall (27) is configured to generate a turbulence, in the mixture path (19), between the gas and the beverage.

* * * * *